United States Patent
Miyajima et al.

(10) Patent No.: US 7,703,561 B2
(45) Date of Patent: Apr. 27, 2010

(54) POWER STEERING SYSTEM

(75) Inventors: Ayumu Miyajima, Narita (JP); Toru Takahashi, Hiratsuka (JP); Naoshi Yamaguchi, Sagamihara (JP); Makoto Yamakado, Tsuchiura (JP); Masanori Ichinose, Tsukuba (JP); Takehiko Kowatari, Kashiwa (JP); Atsushi Yokoyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 317 days.

(21) Appl. No.: 11/599,515

(22) Filed: Nov. 15, 2006

(65) Prior Publication Data
US 2007/0176488 A1 Aug. 2, 2007

(30) Foreign Application Priority Data
Nov. 16, 2005 (JP) ............................. 2005-331034

(51) Int. Cl.
*B62K 17/30* (2006.01)
(52) U.S. Cl. ..................... 180/6.24; 180/407; 180/422
(58) Field of Classification Search ............... 180/6.24, 180/406, 407, 408, 410, 422
See application file for complete search history.

(56) References Cited

U.S. PATENT DOCUMENTS

| | | | | |
|---|---|---|---|---|
| 4,753,310 A * | 6/1988 | Hashimoto | ............... | 180/446 |
| 5,042,238 A * | 8/1991 | White et al. | ............... | 56/11.8 |
| 5,067,577 A | 11/1991 | Morishita | | |
| 5,323,866 A | 6/1994 | Simard et al. | | |
| 5,652,487 A * | 7/1997 | Nishino et al. | ............... | 318/434 |
| 5,704,623 A * | 1/1998 | Chapman | ............... | 280/47.11 |
| 6,456,925 B1 * | 9/2002 | Romig | ............... | 701/93 |
| 6,523,632 B1 * | 2/2003 | Hanaoka et al. | ............... | 180/236 |
| 6,588,858 B2 * | 7/2003 | Ritz et al. | ............... | 303/140 |
| 6,688,089 B2 * | 2/2004 | Velke et al. | ............... | 56/14.7 |
| 6,786,296 B2 * | 9/2004 | Guldner et al. | ............... | 180/402 |
| 6,824,228 B2 * | 11/2004 | Harris et al. | ............... | 303/155 |
| 6,852,061 B2 * | 2/2005 | Schoon | ............... | 475/348 |
| 7,017,327 B2 * | 3/2006 | Hunt et al. | ............... | 56/14.7 |
| 7,152,704 B2 * | 12/2006 | Uemura et al. | ............... | 180/6.24 |
| 7,229,139 B2 * | 6/2007 | Lu et al. | ............... | 303/140 |
| 7,237,629 B1 * | 7/2007 | Bland et al. | ............... | 180/6.24 |
| 2002/0060103 A1 | 5/2002 | Ritz et al. | | |

(Continued)

FOREIGN PATENT DOCUMENTS

CN 2078260 U 6/1991

(Continued)

OTHER PUBLICATIONS

"Automobile Steering System and Driving Stability" edited by Kayaba Industry Co., Ltd., pp. 212-213, Sankaido Publishing Co., Ltd.

(Continued)

*Primary Examiner*—Tony H. Winner
(74) *Attorney, Agent, or Firm*—Crowell & Moring LLP

(57) ABSTRACT

In order to reduce a steering torque during stoppage of a vehicle, according to the invention, opposite drive torques in normal and reverse directions are applied to a left rear wheel and a right rear wheel when a driver steers a steering wheel in a state where the vehicle stops, whereby a moment to turn the vehicle is generated, and an assist torque for steering the steering wheel is generated.

6 Claims, 8 Drawing Sheets

U.S. PATENT DOCUMENTS

2006/0070794 A1* 4/2006 Fujita et al. .................. 180/446

FOREIGN PATENT DOCUMENTS

| CN | 1118590 A | 3/1996 |
|----|-----------|--------|
| DE | 694 09 637 T2 | 11/1998 |
| DE | 100 29 819 C1 | 5/2002 |
| GB | 2 345 895 A | 7/2000 |
| JP | 08 295257 A | 11/1996 |
| JP | 2000 168604 A | 6/2000 |
| JP | 2003 212141 A | 7/2003 |
| JP | 2005-67262 A | 3/2005 |

OTHER PUBLICATIONS

Chinese office action dated Apr. 4, 2008 with English translation.
German Office Action with English translation dated Dec. 1, 2009 (Seven (7) pages).

* cited by examiner

POWER STEERING SYSTEM

BACKGROUND OF THE INVENTION

1. Field of the invention

The present invention relates to a power steering system for assisting steering force of wheels, and relates to a method of driving rear wheels with an effect of reducing a steering torque when steering a steering wheel during stoppage of a vehicle.

2. Description of related art

As a power assist device for assisting the force for steering the wheels in accordance with the steering torque input by a driver, a device using a hydraulic mechanism is general. As an example of this prior art, there is the one in which a hydraulic pressure is generated by driving an oil pump with an electric motor, and the generated hydraulic pressure is controlled by feeding back and controlling the steering torque input from the steering wheel to generate the steering assist force (see JP-A-2003-212141, for example).

In addition, an electric power steering system for assisting the steering only by an electric motor without using a hydraulic mechanism has come to be widely used, mainly in a compact car (see JP-A-8-295257, for example).

Further, there is known an art relating to a hybrid electric hydraulic power steering device capable of realizing energy saving and space saving by using an oil pump capable of discharging an operating oil in both directions to drive a motor on demand (see JP-A-2000-168604, for example).

It is generally known that the steering force in the case of steering the steering wheel when the vehicle is stopping is larger than that in a state where the vehicle is running. Accordingly, the maximum assist force which should be generated by the power steering system is specified by the steering assist force required at the time of stoppage of the vehicle (see "Automobile Steering System and Driving Stability" edited by Kayaba Industry Co., Ltd., P. 213, Sankaido Publishing Co., Ltd., for example).

BRIEF SUMMARY OF THE INVENTION

In the above described conventional art, sufficient attention is not necessarily paid to the method of reducing the steering torque for a driver at the time of stoppage of the vehicle.

As a concrete example of a driving situation, parking is cited. When parking a car in a garage by reversing a vehicle, a driver generally steers a steering wheel while depressing a brake pedal and checking a rear side. The driver steers the steering wheel until a desired tire turning angle to draw a turning radius by which the vehicle is allowed to reach a target position. On this occasion, if sufficient assist cannot be obtained from the power steering system, a burden on steering increases.

In order to generate a large steering assist force, an oil pump, an electric motor and the like which are components of a power steering system are generally increased in capacity and output, and thus there has been the problem that those sizes and weights are inevitably increased to worse the mountability thereof to a vehicle. Further, a generating means of a steering assist force at the time of stoppage of a vehicle depends only on a power steering system, while rear wheels are merely stopped by a braking force and thus do not positively contribute to the steering assist.

An object of the present invention is to reduce a steering torque when steering a steering wheel in a state where a vehicle stops.

In order to attain the above-described object, when a driver steers a steering wheel in a state where a vehicle stops, opposite drive torques in normal and reverse directions are applied to a left rear wheel and a right rear wheel to generate a moment for turning the vehicle so that an assist torque for steering the steering wheel is generated.

Thus, a means for detecting a stopping state of the vehicle may be used to apply a drive torque in a direction to move the vehicle rearward to the right rear wheel and apply a drive torque in a direction to move the vehicle forward to the left rear wheel when detecting the state where the vehicle stops and when steering the steering wheel in a clockwise direction as seen from a driver side. On the other hand, when steering the steering wheel in the counterclockwise direction as seen from the driver side, it is suitable to apply the drive torque in the direction to move the vehicle forward to the right rear wheel and apply the drive torque in the direction to move the vehicle rearward to the left rear wheel.

At this time, the drive torques which are applied to the left rear wheel and the right rear wheel are opposite in the normal and reverse directions with the same absolute value.

When steering the steering wheel in the clockwise direction as seen from the driver side, it is suitable to apply the drive torque in the direction to move the vehicle rearward to the right rear wheel, and apply a brake force to the left rear wheel. On the other hand, when steering the steering wheel in the counterclockwise direction as seen from the driver side, the drive torque in the direction to move the vehicle forward may be applied to the right rear wheel, and the brake force may be applied to the left rear wheel.

Further, when steering the steering wheel in the clockwise direction as seen from the driver side, it is suitable to apply the brake force to the right rear wheel, and apply the drive torque in the direction to move the vehicle forward to the left rear wheel. On the other hand, when steering the steering wheel in the counterclockwise direction as seen from the driver side, the brake force may be applied to the right rear wheel, and the drive torque in the direction to move the wheel rearward may be applied to the left rear wheel.

According to the present invention, when the steering wheel is steered in the state where the vehicle stops, by applying the opposite drive torques in the normal and reverse directions with the same absolute value to the left and right rear wheels, the moment for turning the vehicle is generated, the assist torque for steering the steering wheel can be generated, and the steering torque when steering the steering wheel can be reduced.

Other objects, features and advantages of the invention will become apparent from the following description of the embodiments of the invention taken in conjunction with the accompanying drawings.

DETAILED DESCRIPTION OF THE INVENTION

Figure 1:
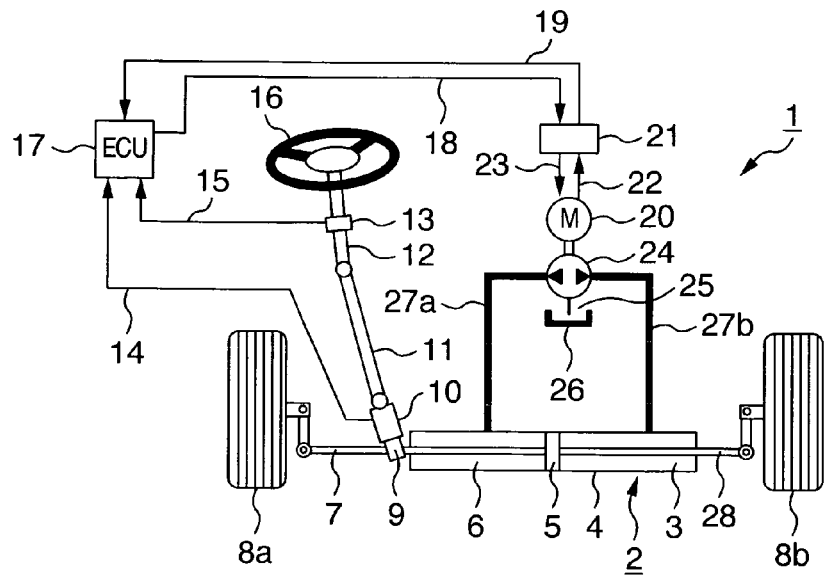
FIG. 1 is an entire view of a power steering system of a first embodiment according to the present invention.

An embodiment of the present invention will be described with reference to FIGS. 1 to 8. In a power steering system 1, a control unit 17 detects a steering torque input by a driver, calculates an assist force command value, and drives an electric motor 20 to steer front wheels 8a and 8b.

A steering input means consists of a steering wheel 16, a steering shaft 12 and an output shaft 11, which are engaged with the steering wheel 16 to transmit a steering torque, a rudder angle sensor 13 provided at the steering shaft 12, a pinion 9 and a steering torque sensor 10 for detecting the steering torque, which are provided at the output shaft 11, and a rack 7 connected to the pinion 9.

In a hydraulic power cylinder 2 which generates an assist force, a piston rod 28 connected to the rack 7 penetrates through an inside of a cylinder 4 extensively provided in a vehicle width direction, and a piston 5 which slides inside the cylinder 4 is fixed to the piston rod 28. Left and right hydraulic chambers 3 and 6 are formed inside the cylinder 4 by the piston 5. A wheel 8a is connected to an end portion of the piston rod 28 via the rack 7, and a wheel 8b is connected to an end portion of the piston rod 28 via a link.

Hydraulic pipes 27a and 27b are connected to a reversible pump 24 which is reversibly rotatable and generates hydraulic pressure, and are respectively connected to the hydraulic chambers 6 and 3, and the reversible pump 24 is connected through a supply passage 25 to an oil tank 26 storing an operating oil. The oil tank 26 recovers the operating oil leaking from the reversible pump 24. A rotary shaft of the reversible pump 24 is engaged with the electric motor 20, and is driven reversibly by the electric motor 20 rotated by receiving a command current from a motor driver 21.

The power steering control unit 17 is connected to the torque sensor 10 via a steering torque signal line 14, connected to the rudder angle sensor 13 via a rudder angle signal line 15, and connected to the motor driver 21 via a command value signal line 18 and a motor rotational speed signal line 19. In the power steering control unit 17, a command value to the electric motor 20 is calculated based on a steering torque which the driver inputs by operating the steering wheel 16. The generated command value is transmitted to the motor driver 21 via the command value signal line 18, and is further input to the electric motor 20 via a driver output cable 23.

Figure 2:
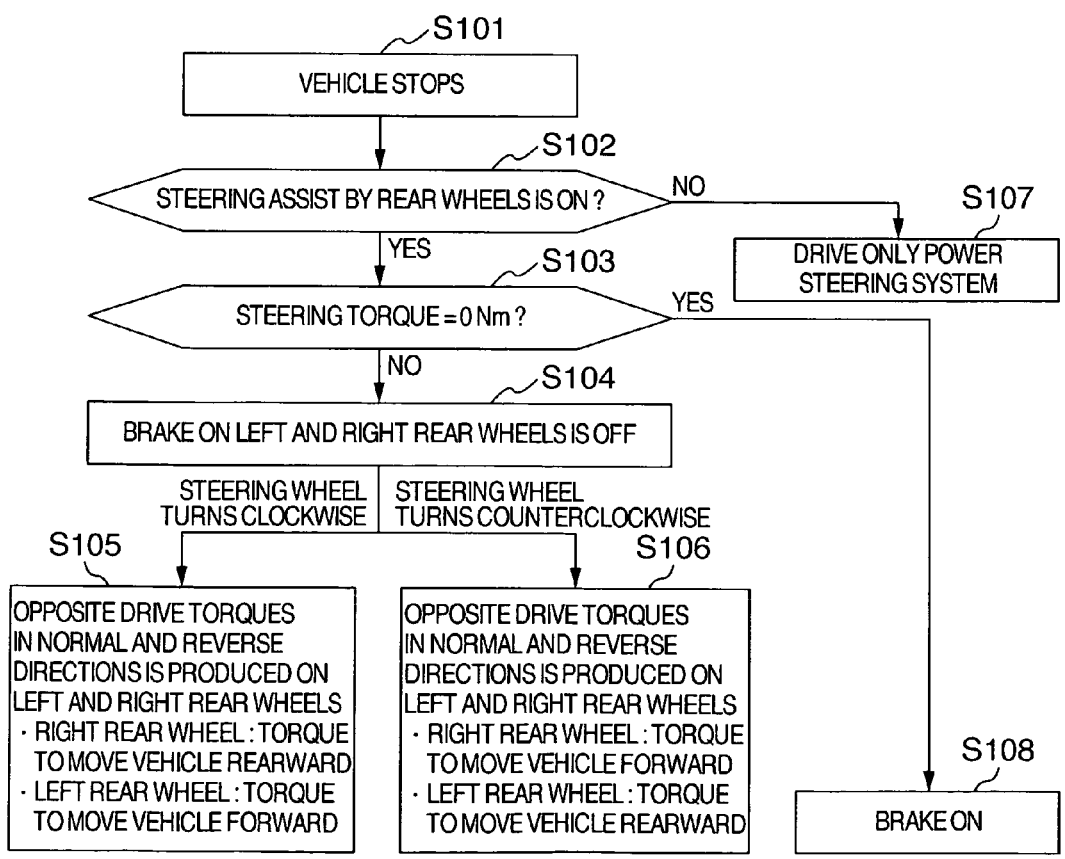
FIG. 2 is a block diagram showing a flow of generating a steering assist force at the time of stoppage of a vehicle according to the present invention.

Next, with reference to FIG. 2, an outline of a flow for generating a steering assist force at the time of stoppage of a vehicle will be described.

In a state in which the vehicle stops (step S101), it is determined whether or not steering assist by the rear wheels is performed in step S102. For determination, for example, a steering assist ON/OFF switch is provided at a driver's seat so that the driver can switch it in accordance with the situation.

When it is determined that the steering assist is not performed in step S102, only the power steering system 1 is driven (step S107). On the other hand, when it is determined that the steering assist is performed, the flow goes to step S103, and it is determined in which direction the steering wheel 16 has been steered. For determination, the steering torque sensor 10 is used.

First, when the steering torque is 0 Nm, it is determined that the steering wheel 16 is not steered (keeps the steering), and the flow goes to step S108, and a braking force is applied to the left rear wheel and the right rear wheel during the driver keeps brake operation. On the other hand, when the steering torque is positive (larger than 0 Nm) or negative (smaller than 0 Nm), it is determined that the steering wheel 16 is steered (steered while being stopped), and the flow goes to step S104 to release brake on the left rear wheel and the right rear wheel. When it is simultaneously determined that the steering wheel 16 is steered in the clockwise direction as seen from the driver side, the flow goes to step S105 and steering assist by the rear wheels is performed.

In step S105, opposite driving torques in normal and reverse directions having the same absolute value are instantly applied to the left rear wheel and the right rear wheel. In this case, the driving torque in the direction in which the vehicle moves rearward is applied to the right rear wheel, and the driving torque in the direction in which the vehicle moves forward is applied to the left rear wheel. On the other hand, when it is determined that the steering wheel 16 is steered in the counterclockwise direction as seen from the driver side, the flow goes to step S106. In step S106, the opposite driving torques in the normal and reverse directions with the same absolute value are instantly applied to the left rear wheel and the right rear wheel. In this case, the driving torque in the direction in which the vehicle moves forward is applied to the right rear wheel, and the driving torque in the direction in which the vehicle moves rearward is applied to the left rear wheel.

In order to determine the rotational direction of the steering wheel, the following method is used. When the steering torque detected by the steering torque sensor 10 is positive (larger than 0 Nm), the rotational direction is determined as clockwise, and when it is negative (smaller than 0 Nm), it is determined as counterclockwise. The signs of the steering torques in the clockwise/counterclockwise directions may be reversed depending on setting of the steering torque sensor 10.

Instead of the steering torque sensor 10, the information from the rudder angle sensor 13 may be used. In this case, the rotational direction of the steering wheel is clockwise when the differential value of the rudder angle (rudder angle speed) is positive (larger than 0 Nm), and is counterclockwise when it is negative (smaller than 0 Nm). The signs of the steering torques in the clockwise/counterclockwise directions may be reversed depending on setting of the rudder angle sensor.

In step S104, only the brake force on one of the rear wheels may be released. In this case, when the steering wheel 16 is steered clockwise as seen from the driver side, only the brake force to the right rear wheel is released and the drive torque in the direction in which the vehicle moves rearward is applied. Alternatively, the brake force to the left rear wheel is released, and the drive torque in the direction in which the vehicle moves forward is applied. On the other hand, when the steering wheel 16 is steered counterclockwise as seen from the driver side, only the brake force to the right rear wheel is released, and the drive torque in the direction in which the vehicle moves forward is applied. Alternatively, only the brake force to the left rear wheel is released, and the drive torque in the direction in which the vehicle moves rearward is applied.

As a method of releasing a brake force, brake pressure may be decreased in the case of a hydraulic brake. In this case, a brake fluid pressure control device capable of controlling left and right brake pressures independently is used.

In order to release steering assist by the rear wheels, and to apply a brake force to the rear wheels, for example, a steering assist ON/OFF switch may be provided at the driver's seat so that the driver can switch the steering assist into OFF.

Figure 3:
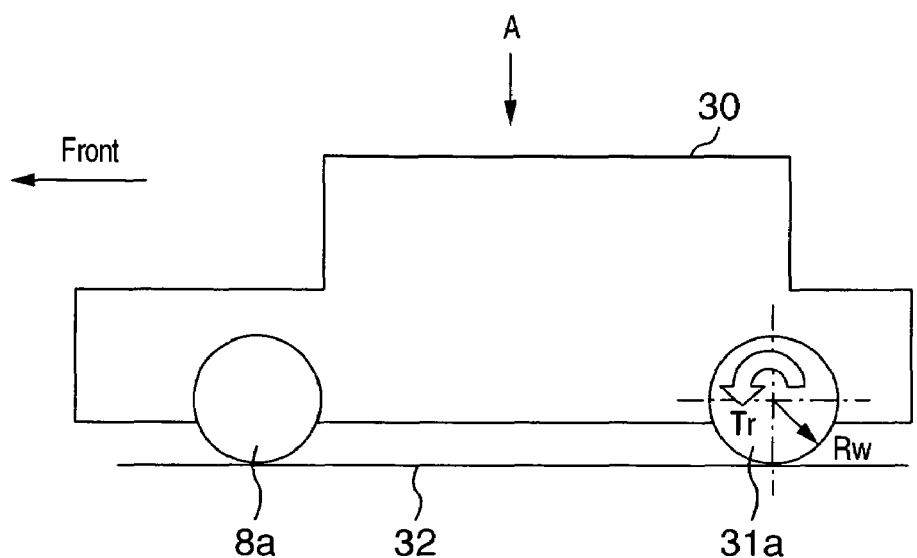
FIG. 3 is a side view schematically showing a vehicle according to the present invention.
Figure 4:
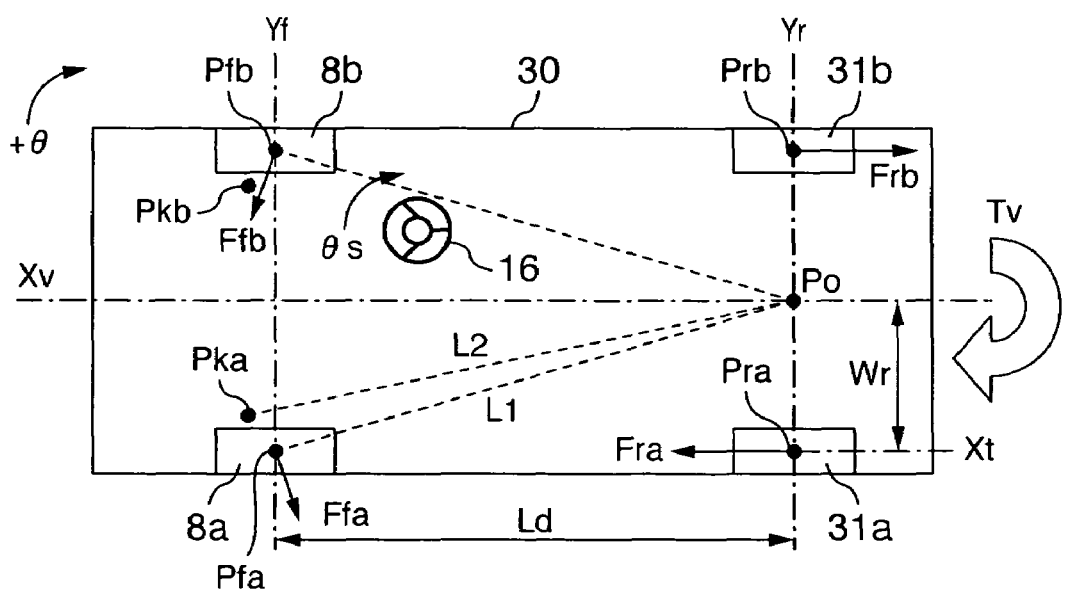
FIG. 4 is a view schematically showing the positional relationship of a vehicle, wheels and a steering wheel according to the present invention.

Next, with reference to FIGS. 3 to 5, the mechanism of the steering assist by drive torques of the rear wheels will be described. FIG. 3 schematically shows a side view of a vehicle 30. FIG. 4 is a view schematically showing the positional relationship of the vehicle, the wheels and the steering wheel when the above described vehicle 30 is seen from the arrow A.

The direction shown by the arrow (Front) is the direction of forward movement of the vehicle 30. The vehicle 30 is provided with a left front wheel 8a, a right front wheel 8b, a left rear wheel 31a and a right rear wheel 31b, and is in contact with a road surface 32.

Here, a mechanism which performs steering assist by driving the rear wheels when steering the steering wheel 16 in a $\theta s$ direction from the vehicle stopping state will be described. In this case, as shown in FIG. 3, a drive torque Tr in the direction in which the vehicle moves forward is loaded on the left rear wheel 31a, and a negative torque −Tr is loaded on the right rear wheel 31b. Since the wheel is an elastic body, the ground contact surface of the wheel is a region having some area, but in this case, it is assumed that the wheel contacts the road surface 32 at one point for simplification. At this time, a contact point of the left rear wheel 31a and the road surface 32 is set as Pra, and a contact point of the right rear wheel 31b and the road surface 32 is set as Prb. The reaction forces received by the wheels from the road surface by the drive torques Tr and −Tr are set as Fra at the point Pra and as Frb at the point Prb.

Here, Fra and Frb can be expressed by the following expression.

$$Fra = -Frb = Tr/Rw \quad \text{(Expression 1)}$$

Note that Rw is the radius of the wheel. By the Fra and Frb, a moment Tv for turning the vehicle 30 occurs. The center of rotation of the vehicle is an intersection point Po of a vehicle center line Xv and a rotation center line Yr of the rear wheels, and the moment Tv is obtained by the following expression.

$$Tv = 2 \times Fra \times Wr \quad \text{(Expression 2)}$$

Here, Wr is a length of half of the distance between the left and right rear wheels (length of half of the tread). Further, in order to be balanced with the moment Tv, a reaction force Ffa from the road surface occurs to the left front wheel 8a at a contact point Pfa with the road surface 32, and a reaction force Ffb from the road surface occurs to the right front wheel 8b at a contact point Pfb with the road surface 32. Here, Ffa and Ffb can be obtained by the following expression.

$$Ffa = Ffb = Tv/(2 \cdot L1) \quad \text{(Expression 3)}$$

Note that L1 is the distance between the vehicle rotation center Po and the point Pfa.

Incidentally, a member generally called as a king pin is provided at a front wheel portion of the vehicle 30, and operates so as to ultimately transmit a steering force from the power steering system 1 to the front wheel. The front wheels perform rotational movement around the king pins. This is described in, for example, the document of "Movement and Control of Automobiles" (written by Masato Abe, Sankaido Publishing Co., Ltd., pp. 129 to 130).

When contact points of extension lines of shafts of the king pins provided at the left and right front wheels are set as Pka and Pkb respectively, the following relationship is generally established due to the vehicle structure.

$$L1 < L2 \quad \text{(Expression 4)}$$

Note that L2 is the distance of the rotation center $P_0$ of the vehicle and Pka (the distance between the rotation center $P_0$ of the vehicle and Pkb is the same).

Figure 5:
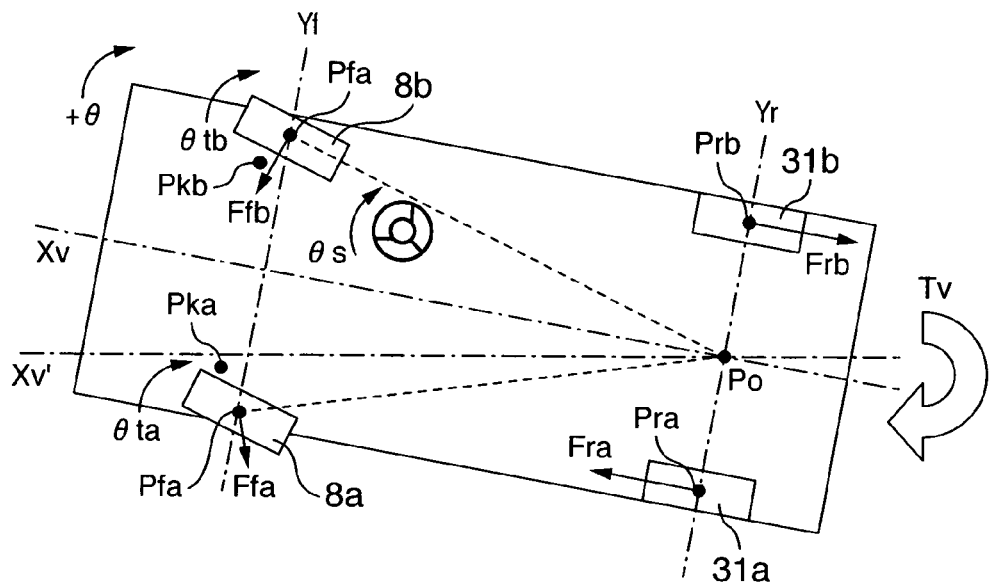
FIG. 5 is a view showing a state in which a vehicle 30 according to the present invention turns by a drive torque load onto rear wheels.

FIG. 5 is a view showing a state in which the vehicle 30 is turned by the drive torque load to the rear wheels. By the relationship of the above described reaction forces Ffa and Ffb and Expression 4, the left front wheel 8a rotates in a $\theta ta$ direction and the right front wheel 8b rotates in a $\theta tb$ direction. The rotating directions of these wheels coincide with the rotational direction of the steering wheel $\theta s$, and therefore, it is obvious that they assist steering.

Figure 6:
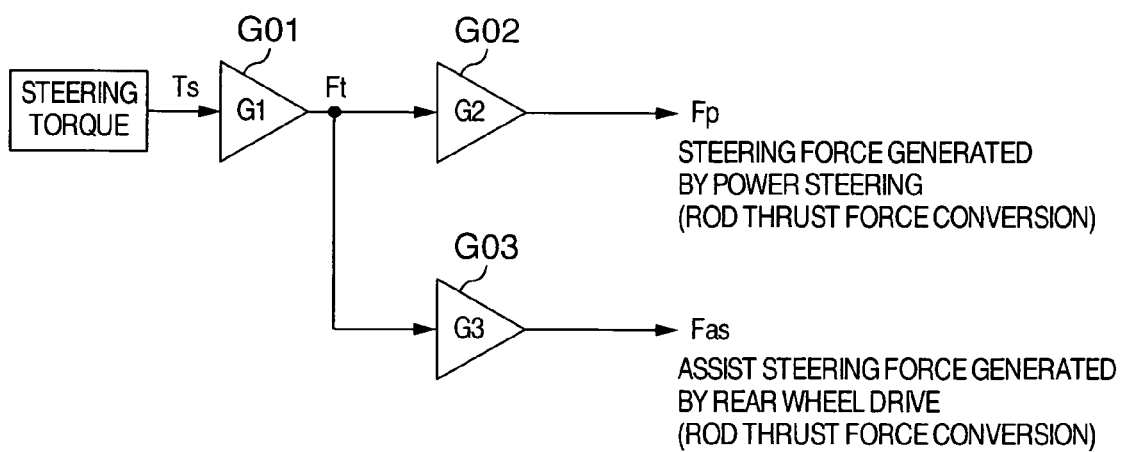
FIG. 6 is a diagram showing a flow of calculating a steering force generated by a power steering, and a steering assist force by the rear wheel drive by the present invention, on the basis of a steering torque detection value, according to the present invention.

FIG. 6 is a diagram showing a flow of calculating a steering force generated by the power steering and a steering assist force by the rear wheel drive according to the present invention, on the basis of a steering torque detection value. A required total steering force Ft(N) is obtained by multiplying a detected steering torque Ts (Nm) by a gain G1 (block G01). Note that Ft is a thrust force applied to the rod 7. Next, by multiplying the total steering force Ft by a gain G2 (block G02), a steering force Fp(N) which should be generated by the power steering is obtained. Meanwhile, by multiplying the total steering force Ft by a gain G3 (block G03), a steering force Fas(N) supplemented by rear wheel drive is obtained. Here, the relationship between the gains G2 and G3 is obtained by the following expression.

$$G2 + G3 = 1 \quad \text{(Expression 5)}$$

Figure 7:
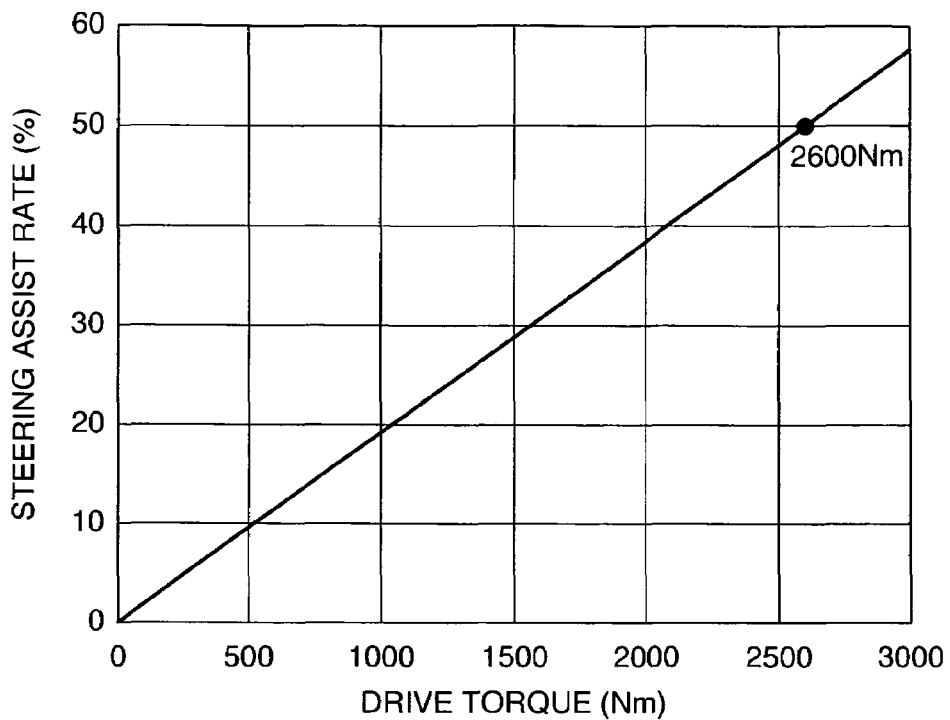
FIG. 7 is a simple calculation result showing a ratio of assisting the steering of the drive torque loaded on a rear wheel on one side according to the present invention.

FIG. 7 is a simple calculation result showing a ratio of the drive torque loaded onto one rear wheel side assisting steering at the time of stoppage of a vehicle. In the case of the power steering system having the ability of 8000 N as the maximum thrust force of the rod 7, if 2600 Nm is loaded as one rear wheel side drive torque, the steering force corresponding to 50% of the power steering system can be generated.

Figure 8:
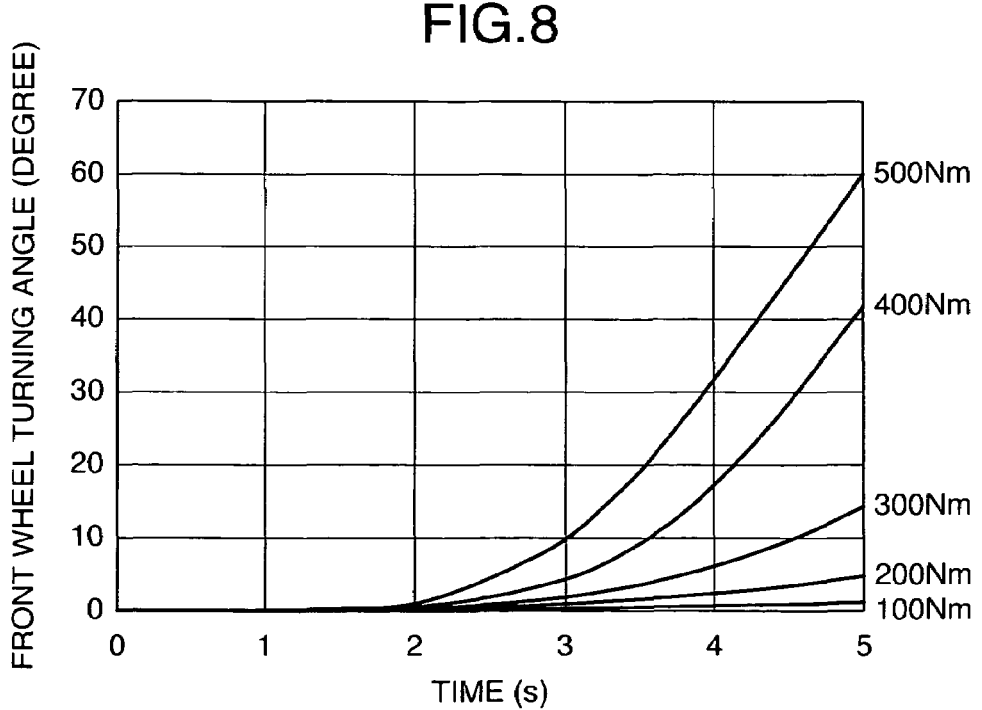
FIG. 8 is a simple simulation result of a turning angle of the front wheels when loading drive torques opposite in normal and reverse directions on the rear wheels according to the present invention.

FIG. 8 is a result of a simple simulation of a turning angle of the front wheels when opposite drive torques in the normal and reverse directions are loaded to the rear wheels. In the simulation, by using three-dimensional mechanism analysis software, a calculation model is set as a simple rigid model, and a vehicle body and four wheels are modeled. Accordingly, a steering torque is not input from the steering wheel 16, and the front wheels are steered only by the steering assist force from the rear wheels. When the drive torque loaded on one rear wheel side is increased to 100 Nm, 200 Nm, 300 Nm, 400 Nm and 500 Nm, it can be confirmed that the front wheel turning angle gradually becomes larger.

In the case of using the power steering system 1 of this embodiment which is constructed as above, by selecting the steering assist function by the rear wheels at the time of stoppage of the vehicle, and by loading the opposite drive torques in the normal and reverse directions on the left and right rear wheels, it is possible to generate a moment which turns the vehicle 30, and by the reaction forces from the road surface 32 which are produced on the left and right front wheels so as to be balanced with the moment, the left and right front wheels rotate around the left and right ground contact points Pka and Pkb of the king pins. Accordingly, it is possible to decrease the maximum output power of the power steering system 1, and it is possible to contribute to power saving. Since reduction in size of the power steering system is achieved, mountability is enhanced, and it can be applied to many kinds of vehicles.

In order to confirm that this embodiment is carried out, it has to be only confirmed that the left and right rear wheels rotate in the opposite directions to each other in the situation where the vehicle stops and the driver steers the steering 16.

Figure 9:
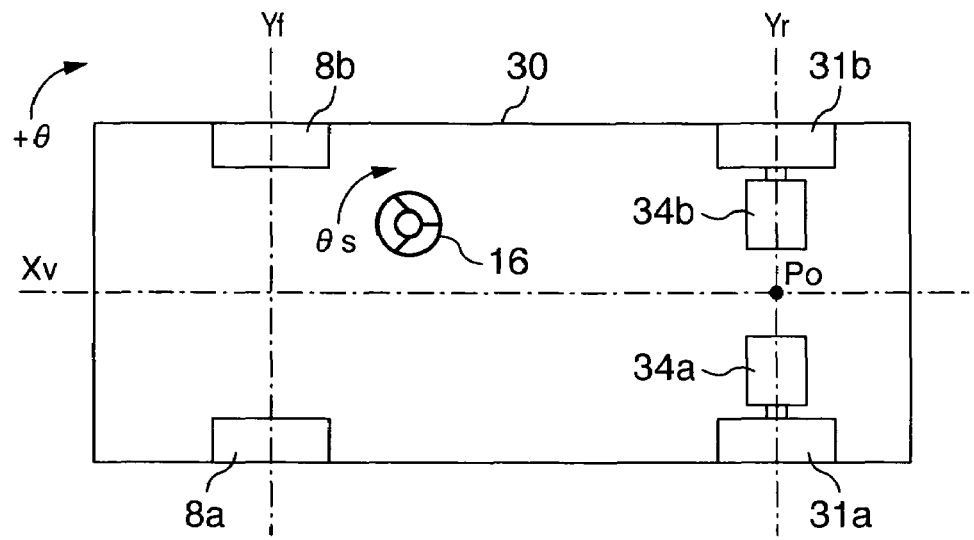
FIG. 9 is an entire view of a power steering system in another embodiment according to the present invention.

Next, another embodiment of the present invention will be described by using FIG. 9. In the vehicle 30, the means of generating the drive torque of the rear wheels is an left rear wheel actuator 34a engaged with a rotary shaft of the left rear wheel 31a and a right rear wheel actuator 34b engaged with a rotary shaft of the right rear wheel 31b. For the actuators 34a and 34b, wheel-in motors integrated with the left and right wheels 31a and 31b may be used. Further, the actuators 34a and 34b may be provided at the left and right of the front wheels.

Figure 10:
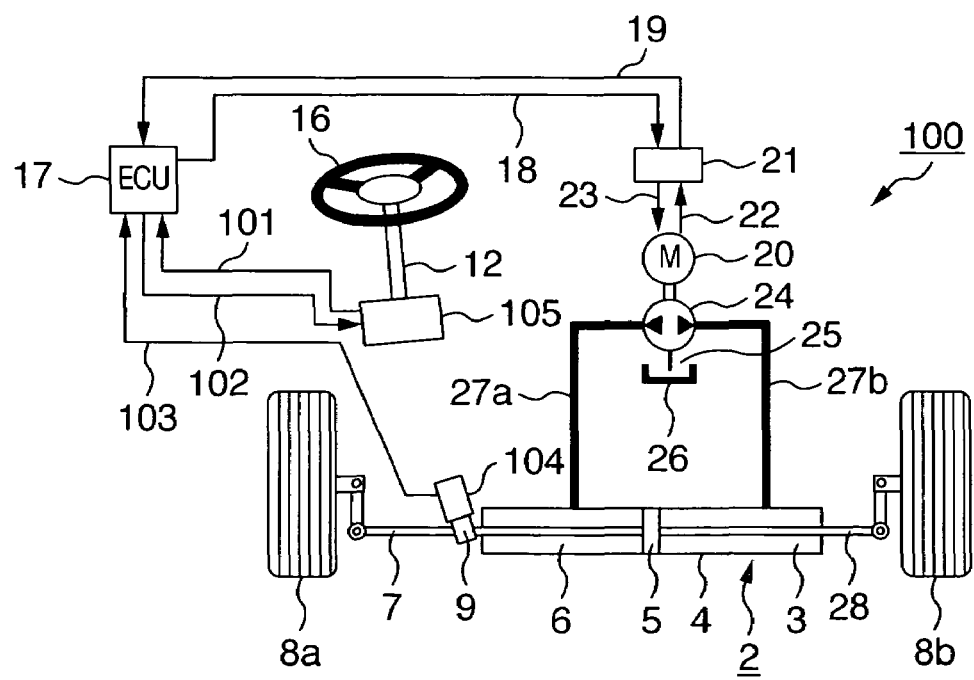
FIG. 10 is an entire view of a power steering system in another embodiment according to the present invention.

Next, still another embodiment of the present invention will be described by using FIG. 10. In a power steering system 100, a steering input means consists of the steering wheel 16, the steering shaft 12 which is engaged with the steering wheel 16 to transmit a steering torque, and a steering reaction force generating unit 105.

The power steering control unit 17 detects a rudder angle from the steering reaction force generating unit 105 via a rudder angle signal line 101 instead of the rudder angle sensor 13 and the steering torque sensor 10 of the first embodiment, and detects a wheel-turning torque from a wheel-turning torque sensor 104 via a wheel-turning torque signal line 103, and thereby, calculates a command value to the electric motor 20. This embodiment differs from the first embodiment in the respect that the steering force input from the steering wheel 16 is not directly transmitted to the pinion 9, but this embodiment adopts a steer-by wire system mechanically insulated.

In the steer-by wire system, steering reaction forces from the wheels 8a and 8b are required to be generated, and therefore, the power steering control unit 17 generates a steering reaction force and inputs a reaction force command value into the steering reaction force generating unit 105 via a reaction force command signal line 102. In this embodiment, a vibrating force from the road surface is not directly transmitted to the steering wheel 16, and therefore, it is effective for enhancing steering feeling. The other components are the same as those of the first embodiment, and therefore, explanation thereof will be omitted.

In order to confirm that this embodiment is carried out, it only has to be confirmed that the left and right rear wheels rotates in the reverse directions from each other in the situation where the vehicle stops and the driver steers the steering 16 as in the first embodiment.

Figure 11:
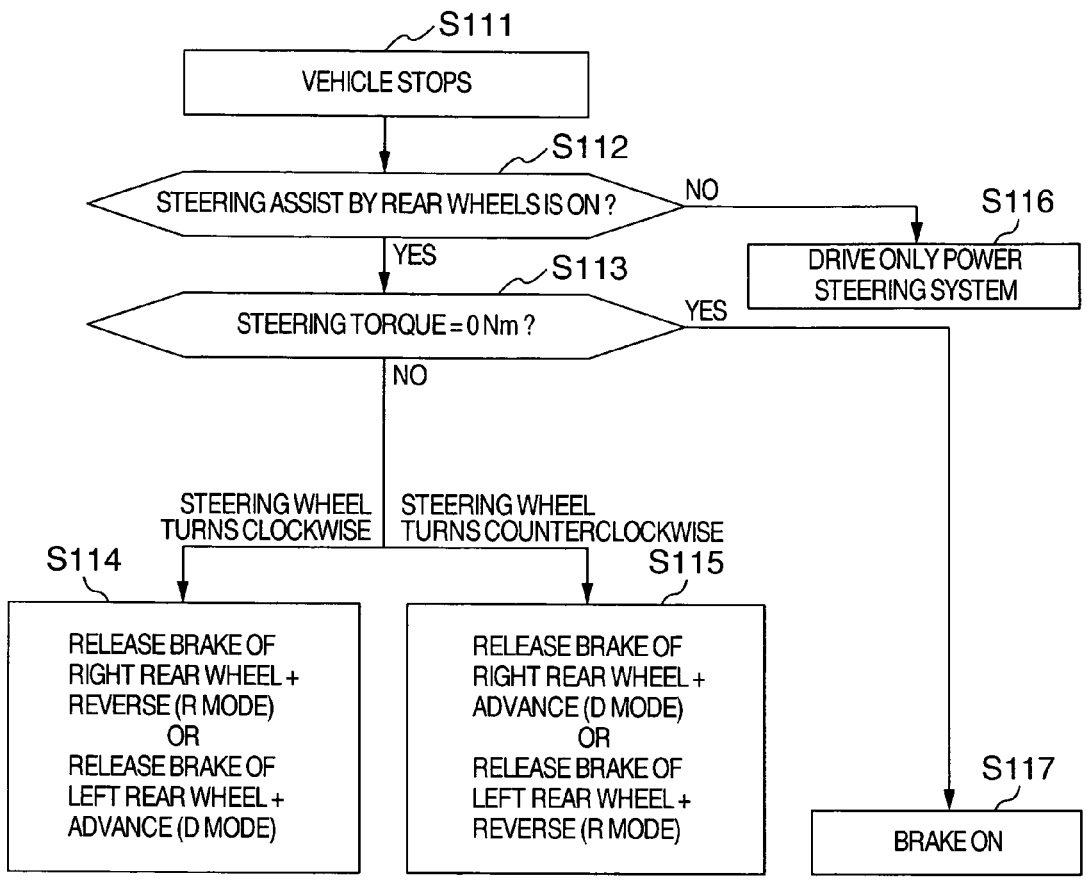
FIG. 11 is a schematic diagram of a flow for generating a steering assist force in another embodiment according to the present invention.

Next, another embodiment of the present invention will be described by using FIG. 11. FIG. 11 is an outline of a flow for generating a steering assist force at the time of stoppage of a vehicle.

In the state in which the vehicle stops (step S111), it is determined whether or not steering assist by the rear wheels is performed in step S112. When it is determined that the steering assist is not performed in step S112, only the power steering system 1 is driven (step S116). On the other hand, when it is determined that the steering assist is performed, the flow goes to step S113, and it is determined in which direction the steering wheel 16 is steered. For determination, it is suitable to use the steering torque sensor 10.

First, when the steering torque is 0 Nm, it is determined that the steering wheel 16 is not steered (keeps the steering state), and the flow goes to step S117, and a brake force is applied to the left and right rear wheels during the driver keeps brake operation. When the steering torque is positive (larger than 0 Nm) or negative (smaller than 0 Nm), it is determined that the steering wheel 16 is steered (steered while stopping the vehicle), and the flow goes to step S114 or step S115. Here, the condition for going to step S114 is that the steering wheel 16 is steered in the clockwise direction as seen from the driver side.

In step S114, only brake on the right rear wheel is released to move the vehicle rearward. Alternatively, only brake on the left right wheel is released to move the vehicle forward. Meanwhile, the condition for going to step S115 is that the steering wheel 16 is steered in the counterclockwise direction as seen from the driver side. In step S115, only brake on the left rear wheel is release to move the vehicle rearward. Alternatively, only brake on the right rear wheel may be released to move the vehicle forward.

In this embodiment, the steering assist by the rear wheels is possible by releasing the brake force on any one of the left rear wheel and the right rear wheel, and the left rear wheel and the right rear wheel do not have to be driven independently. Therefore, it is effective for simplifying the device construction and the controllability. The other components are the same as in the first embodiment, and therefore, explanation thereof will be omitted.

Figure 12:
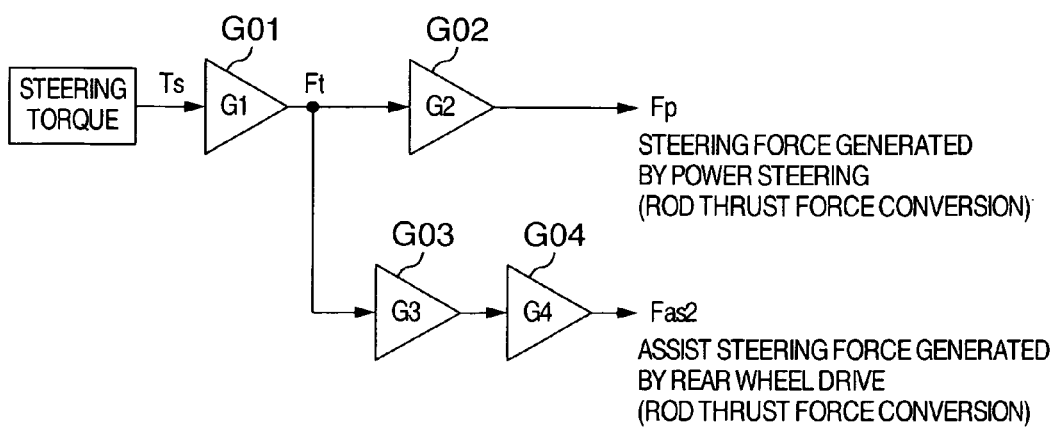
FIG. 12 is a diagram showing a flow of calculating a steering force generated by a power steering and a steering assist force by rear wheel drive by the present invention when considering a temperature change of power steering oil, in another embodiment according to the present invention.

Next, still another embodiment of the present invention will be described by using FIGS. 12 and 13. FIG. 12 is a diagram showing a flow of calculating the steering force generated by the power steering and the steering assist force by the rear wheel drive according to the present invention when considering the temperature change in power steering oil.

In this embodiment, in order to perform temperature compensation of the power steering oil, a temperature compensation gain G4 (block G04) is added to the first embodiment. A steering force Fas2(N) which should be supplemented by the rear wheel drive is obtained by multiplying the required total steering force Ft(N) by the gain G3 (block G03), which is further multiplied by the temperature compensation gain G4 (block G04).

Figure 13:
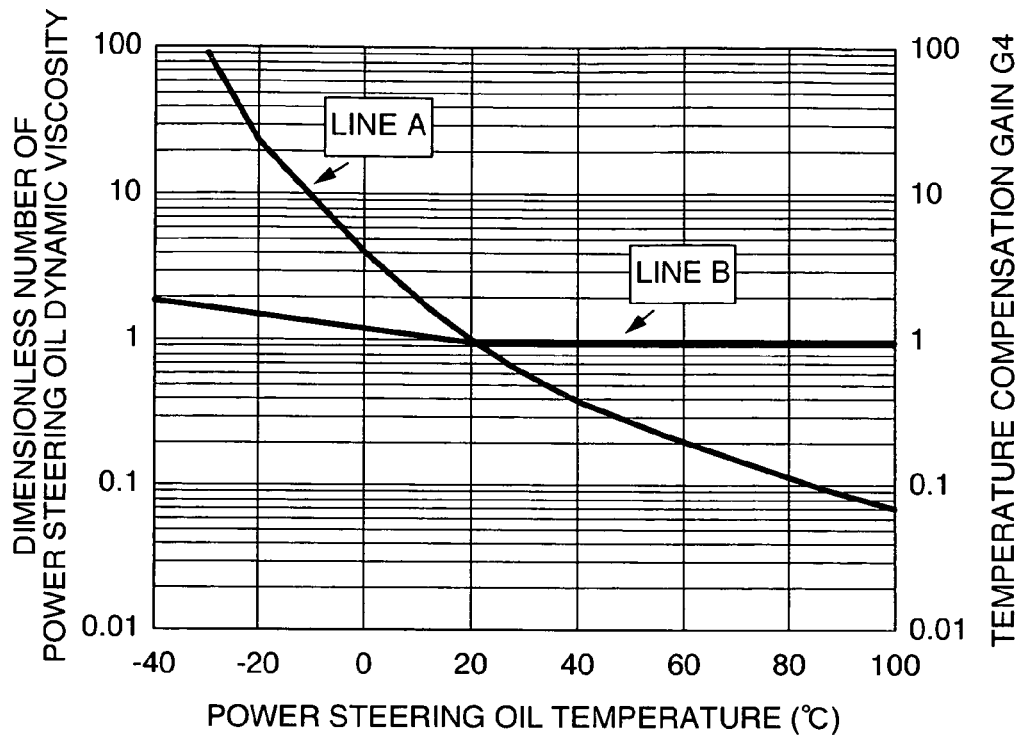
FIG. 13 is a graph showing one example of a temperature compensation gain G4 in another embodiment according to the present invention.

FIG. 13 is a graph showing one example of the temperature compensation gain G4. The horizontal axis of the graph represents the temperature of the power steering oil, the left vertical axis represents the value of the dynamic viscosity of the power steering oil, which is made dimensionless by setting the value at a room temperature (20° C.) as 1 (plotted by line A), and the right vertical axis represents the temperature compensation gain G4 (plotted by line B). The dynamic viscosity becomes larger as the temperature becomes lower, and causes increase in frictional loss at a pump part, piping and the like of the power steering system. Thus, in order to compensate steering force reduction due to the frictional loss, it is suitable to set the temperature compensation gain G4 like the line B. In this embodiment, when the temperature of the power steering oil is low, it is possible to obtain the steering force equivalent to that at the room temperature, and therefore, it is effective for reducing incompatibility in steering. The other components are the same as those in the first embodiment, and therefore, explanation thereof will be omitted.

Figure 14:
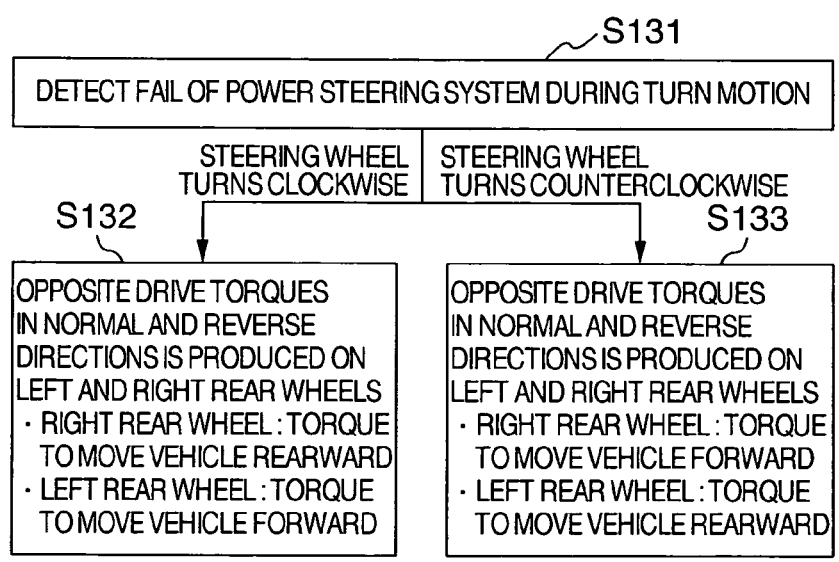
FIG. 14 is a diagram showing a flow of a rear wheel steering assist when a power steering system fails during vehicle turning driving, in another embodiment according to the present invention.

Next, still another embodiment of the present invention will be described by using FIGS. 14 and 15. FIG. 14 is a diagram showing a flow of the rear wheel steering assist when the power steering system fails during the vehicle moves while making a turn.

When the failure of the power steering system is detected during the vehicle moves to turn (S131), if the steering wheel 16 is steered in the clockwise direction as seen from the driver side, the flow goes to step S132, and opposite drive torques in the normal and reverse directions with the same absolute value are applied to the left rear wheel and the right rear wheel. Here, the drive torque in the direction in which the vehicle moves rearward is applied to the right rear wheel, and the drive torque in the direction in which the wheel moves forward is applied to the left rear wheel. On the other hand, when it is determined that the steering wheel 16 is steered in the counterclockwise direction as seen from the driver side, the flow goes to step S133. In step S133, the opposite drive torques in the normal and reverse directions with the same absolute value are applied to the left rear wheel and the right rear wheel. Here, the drive torque in the direction in which the vehicle moves forward is applied to the right rear wheel, and the drive torque in the direction in which the vehicle moves rearward is applied to the left rear wheel.

Figure 15:
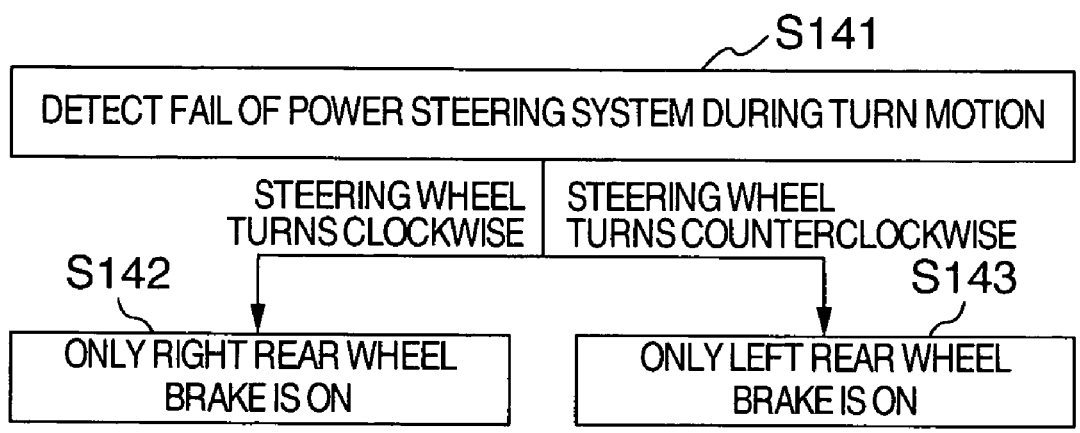
FIG. 15 is a diagram showing a flow of performing a rear wheel steering assist only by brake control when a power steering system fails during vehicle turning driving in another embodiment according to the present invention.

FIG. 15 is a diagram showing a flow of performing rear wheel steering assist only by brake control when the power steering system fails during the vehicle moves while making a turn. When failure of the power steering system is detected during the turn motion of the vehicle (S141), if the steering wheel 16 is steered in the clockwise direction as seen from the driver side, the flow goes to step S142, and a brake force is applied only to the right rear wheel. On the other hand, when the steering wheel 16 is steered in the counterclockwise direction as seen from the driver side, the flow goes to step S143, and a brake force is applied only to the left rear wheel. In this embodiment, even if the power steering fails at an intersection, a curve or the like, it is possible to assist steering, and this is effective for ensuring safety. The other components are the same as those in the first embodiment, and therefore, explanation thereof will be omitted.

In each of the above described embodiments, as a rear wheel braking force control device, a left rear wheel brake actuator (not shown), a right rear wheel brake actuator (not shown) and a controller for controlling each of the brake actuators are preferably included at the left rear wheel and the right rear wheel so as to be capable of independently controlling the brake force on each of the wheels. Such a brake actuator can be constructed by using a hydraulic or an electromagnetic actuator, or an electric motor. In the case of using hydraulic pressure, it is suitable to include a hydraulic pump, an electric motor which drives the hydraulic pump, and a brake mechanism which applies a braking force to rear wheels by fluid pressure generated by the hydraulic pump.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power steering system comprising:
a steering actuator which applies a steering assist force to a front wheel which turns in accordance with a steering state by a driver,
a steering state detecting means which detects the steering state by the driver,
a rear wheel side actuator which applies drive torques to left and right rear wheels, and
a power steering control unit, which monitors a state of the steering actuator and increases the drive torque of the rear wheel side actuator based upon the state of the steering actuator,
wherein opposite drive torques in normal and reverse directions are produced on the respective left and right rear wheels, or a drive torque is produced on one of the wheels while a braking force is produced on the other wheel, based on the steering state in a vehicle stopping state, by controlling driving of the rear wheel side actuator.

2. A power steering system comprising:
a steering actuator which applies a steering assist force to a front wheel which turns in accordance with a steering state by a driver,
a steering state detecting means which detects the steering state by the driver, and
a rear wheel side actuator which applies drive torques to left and right rear wheels,
wherein opposite drive torques in normal and reverse directions are produced on the respective left and right rear wheels, or a drive torque is produced on one of the wheels while a braking force is produced on the other wheel, based on the steering state in a vehicle stopping state, by controlling driving of the rear wheel side actuator,
the steering actuator comprises a hydraulic power cylinder and a hydraulic pressure supply means which selectively supplies hydraulic pressure to left and right pressure chambers of the hydraulic power cylinder, and
the drive torque of the rear wheel side actuator is controlled so as to compensate for reductions in steering force due to frictional loss produced by dynamic viscosity changes.

3. The power steering system according to claim 2, wherein the drive torque of the rear wheel side actuator increases as the dynamic viscosity increases.

4. A power steering system comprising:
a steering actuator which applies a steering assist force to a front wheel which turns in accordance with a steering state by a driver,
a steering state detecting means which detects the steering state by the driver,
a rear wheel side actuator which applies drive torques to left and right rear wheels, and
a torque sensor which detects a steering torque of the driver,
wherein opposite drive torques in normal and reverse directions are produced on the respective left and right rear wheels, or a drive torque is produced on one of the wheels while a braking force is produced on the other wheel, based on the steering state in a vehicle stopping state, by controlling driving of the rear wheel side actuator, and the drive torque of the rear wheel side actuator is controlled based on the steering torque.

5. The power steering system according to claim 4, wherein the drive torque of the rear wheel side actuator increases as the steering torque increases.

6. A power steering system comprising:

a steering actuator which applies a steering assist force to a front wheel which turns in accordance with a steering state by a driver, a steering state detecting means which detects the steering state by the driver, and a rear wheel side actuator which applies drive torques to left and right rear wheels, wherein braking forces of the left and right rear wheels are released when the rear wheel side actuator generates a drive torque irrespective of foot brake operation, and opposite drive torques in normal and reverse directions are produced on the respective left and right rear wheels, or a drive torque is produced on one of the wheels while a braking force is produced on the other wheel, based on the steering state in a vehicle stopping state, by controlling driving of the rear wheel side actuator.

* * * * *